US012587067B1

(12) United States Patent
Backus et al.

(10) Patent No.: US 12,587,067 B1
(45) Date of Patent: Mar. 24, 2026

(54) CLOSED BRAYTON CYCLE SHUTDOWN CONTROL WITH ISOLATED FLUID RESERVOIR FOR COOLING ELECTRICAL COMPONENTS

(71) Applicant: Rolls-Royce North American Technologies Inc., Indianapolis, IN (US)

(72) Inventors: Neil Backus, Indianapolis, IN (US); Michael Monzella, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 0 days.

(21) Appl. No.: 19/086,051

(22) Filed: Mar. 20, 2025

(51) Int. Cl.
| | |
|---|---|
| *H02K 9/10* | (2006.01) |
| *F02C 1/05* | (2006.01) |
| *F02C 1/10* | (2006.01) |
| *H02K 7/18* | (2006.01) |

(52) U.S. Cl.
CPC ................. *H02K 9/10* (2013.01); *F02C 1/05* (2013.01); *F02C 1/10* (2013.01); *H02K 7/1823* (2013.01); *F05D 2220/76* (2013.01)

(58) Field of Classification Search
CPC .......... H02K 9/10; H02K 7/1823; F02C 1/05; F02C 1/10; F05D 2220/76
See application file for complete search history.

(56) References Cited

U.S. PATENT DOCUMENTS

| | | | |
|---|---|---|---|
| 3,864,919 | A | 2/1975 | Frutschi |
| 4,293,384 | A | 10/1981 | Weber |
| 4,761,957 | A | 8/1988 | Eberhardt et al. |
| 5,165,239 | A | 11/1992 | Bechtel et al. |
| 5,799,490 | A | 9/1998 | Bronicki et al. |
| 7,406,829 | B2 | 8/2008 | Coffinberry |
| 9,534,537 | B2 | 1/2017 | Gagne et al. |
| 9,752,462 | B1 | 9/2017 | Fletcher |

(Continued)

FOREIGN PATENT DOCUMENTS

| | | |
|---|---|---|
| CN | 109677639 B | 8/2020 |
| GB | 2612836 A | 5/2023 |
| TW | I547634 B | 9/2016 |

OTHER PUBLICATIONS

NASA, Power Conversion Technology for Fission Systems, Jul. 7, 2023, 65 pages.

(Continued)

*Primary Examiner* — Joseph Ortega
(74) *Attorney, Agent, or Firm* — Barnes & Thornburg

(57) ABSTRACT

A power-generation system includes an electrical system, a turbine engine, and a fluid control system. The turbine engine includes a compressor configured to receive and compress a working fluid, a heat source that transfers heat to the compressed working fluid, a turbine fluidly connected with the compressor to extract work from the heated working fluid and drive rotation of the compressor, and a first heat-exchanger fluidly connected with the turbine to transfer heat away from the heated working fluid to provide a cooled working fluid. The fluid control system fluidly is connected with the electrical system and the turbine engine to circulate the working fluid through the electrical system and the turbine engine.

20 Claims, 2 Drawing Sheets

(56) References Cited

U.S. PATENT DOCUMENTS

| | | | |
|---|---|---|---|
| 9,853,335 B2 | 12/2017 | Blackwelder et al. | |
| 10,609,839 B1 | 3/2020 | Archer et al. | |
| 11,396,826 B2 | 7/2022 | Bollinger et al. | |
| 11,480,067 B2 | 10/2022 | Truong | |
| 11,499,474 B2 | 11/2022 | Michalik et al. | |
| 11,680,472 B2 | 6/2023 | Zhong et al. | |
| 11,885,244 B2 | 1/2024 | Bollinger et al. | |
| 11,927,130 B2 | 3/2024 | Apte et al. | |
| 11,982,227 B2 | 5/2024 | Homison | |
| 11,982,228 B2 | 5/2024 | Bollinger et al. | |
| 12,012,902 B2 | 6/2024 | Apte et al. | |
| 12,022,636 B2 | 6/2024 | Unton | |
| 12,123,347 B2 | 10/2024 | Bollinger et al. | |
| 12,173,643 B2 | 12/2024 | Bollinger et al. | |
| 2005/0097896 A1 | 5/2005 | Critchley et al. | |
| 2010/0050639 A1 | 3/2010 | Janus et al. | |
| 2010/0064688 A1 | 3/2010 | Smith | |
| 2011/0262269 A1 | 10/2011 | Lior | |
| 2015/0240665 A1 | 8/2015 | Stapp | |
| 2016/0128231 A1 | 5/2016 | Wagoner et al. | |
| 2019/0178111 A1 | 6/2019 | Uechi et al. | |
| 2020/0191051 A1 | 6/2020 | Homison et al. | |
| 2022/0029454 A1 | 1/2022 | Sweet et al. | |
| 2022/0049653 A1* | 2/2022 | Bollinger | F02C 6/14 |
| 2022/0252006 A1 | 8/2022 | Michalik et al. | |
| 2023/0155388 A1 | 5/2023 | Fernando | |

OTHER PUBLICATIONS

NASA, Closed Brayton Cycle Power Conversion Unit for Fission Surface Power Phase I Final Report, Jun. 1, 2010, 75 pages.

* cited by examiner

CLOSED BRAYTON CYCLE SHUTDOWN CONTROL WITH ISOLATED FLUID RESERVOIR FOR COOLING ELECTRICAL COMPONENTS

STATEMENT REGARDING FEDERALLY SPONSORED RESEARCH OR DEVELOPMENT

Embodiments of the present disclosure were made with government support under Contract No. 80GRC024CA004. The government may have certain rights.

FIELD OF THE DISCLOSURE

The present disclosure relates generally to closed Brayton cycle power-generation systems, and more specifically to controlling the temperature of electrical hardware that is powered by such systems.

BACKGROUND

Brayton cycle power-generation systems may be used to power spacecraft, aircraft, watercraft, and power generators. Conventional power-generation systems include a turbine engine having a compressor configured to compress a working fluid, a heat source for heating the compressed working fluid, and a turbine that extracts work from the heated compressed working fluid to power a fan, shaft, generator, etc. Power-generation systems may be open loop or closed-loop.

In some systems, the heat from the heat source is transferred to the working fluid with a heat exchanger such that no combustion products travel through the compressor or the turbine. This may allow externally-heated gas turbine engines to operate with fuel sources that may ordinarily damage or are not compatible with the internal components of the system. In closed Brayton cycle systems, the working fluid is recirculated through the compressor, the heat exchanger, and the turbine. In open Brayton cycle systems, new working fluid may be continuously introduced to the compressor.

The components of the power-generation system, including electrical systems powered by the turbine engine, generate heat during operation. There remains interest in controlling a temperature of the components and electrical systems in Brayton cycle power-generation systems to avoid overheating of the components.

SUMMARY

The present disclosure may comprise one or more of the following features and combinations thereof.

A power-generation system may comprise an electrical system, a turbine engine, and a closed-loop fluid control system. The closed-loop fluid control system may be fluidly connected with the electrical system and the turbine engine to circulate working fluid through the electrical system and the turbine engine.

In some embodiments, the electrical system may include a motor-generator and an electric power conditioning and distribution system connected with the motor-generator. The motor-generator may be operable in a power-generation mode to produce electrical energy and a motor mode to convert the electrical energy into rotational power. The electrical system may be configured for fluid cooling for removing heat from the electrical system.

In some embodiments, the turbine engine may include a compressor, a reactor heat-exchanger downstream of the compressor, a turbine downstream of the reactor heat-exchanger, and a cooling heat-exchanger downstream of the turbine. The compressor may be configured to receive the working fluid and compress the working fluid to provide a compressed working fluid. The reactor heat-exchanger may transfer heat from a nuclear reactor to the compressed working fluid to provide a heated working fluid. The turbine may be configured to extract work from the heated working fluid and drive rotation of the compressor and the motor-generator. The cooling heat-exchanger may transfer heat away from the heated working fluid to provide a cooled working fluid.

In some embodiments, the fluid control system may include a reservoir tank. The reservoir tank may be fluidly connected downstream of the cooling heat-exchanger. The reservoir tank may be configured to store a predetermined minimum volume of the working fluid at a predetermined minimum temperature that is less than a temperature of the working fluid at the turbine or the reactor heat-exchanger. In some embodiments, the predetermined minimum volume of the working fluid may be sufficient so as to provide additional thermal mass to lower an overall equilibrium temperature of the working fluid after a shutdown of the turbine engine in which a speed of the compressor and the turbine is below a predetermined speed so that a temperature of the electrical system is maintained within a desired temperature threshold after the shutdown of the turbine engine.

In some embodiments, the working fluid in the reservoir tank may envelop the electrical system. The working fluid in the reservoir tank may envelop the electrical system to help maintain the temperature of the electrical system within the desired temperature threshold after the shutdown of the turbine engine.

In some embodiments, the predetermined minimum volume of the working fluid may be equal to or greater than a total volume of the working fluid in at least the turbine and the reactor heat-exchanger of the system. In some embodiments, the predetermined minimum volume of the working fluid may be 1.1 times the total volume of the working fluid in at least the turbine and the reactor heat-exchanger of the system.

In some embodiments, the predetermined minimum volume may be equal to or greater than at least 0.4 times a total volume of the working fluid in at least the turbine and the reactor heat-exchanger of the system. In some embodiments, the predetermined minimum volume of the working fluid may be about 0.9 times the total volume of the working fluid in at least the turbine and the reactor heat-exchanger of the system.

In some embodiments, the turbine engine may further include a heat recuperator. The heat recuperator may transfer heat from the heated working fluid received from the turbine to the compressed working fluid passing from the compressor to the reactor heat-exchanger. In some embodiments, the predetermined minimum volume of the working fluid may be equal to or greater than the total volume of the working fluid in the turbine, the reactor heat-exchanger, and the heat recuperator of the system.

In some embodiments, the motor-generator may be coupled with the compressor. The motor-generator may be configured to operate in the motor mode to start the turbine engine and to operate in the power-generation mode to be driven by the turbine and generate the electrical energy.

According to another aspect of the present disclosure, a power-generation system may comprise an electrical system, a turbine engine, and a fluid control system. The turbine engine may include a compressor, a heat source, a turbine engine, and a first heat-exchanger. The compressor may be configured to receive a working fluid and compress the working fluid to provide a compressed working fluid. The heat source may transfer heat to the compressed working fluid to provide a heated working fluid. The turbine may be fluidly connected with the compressor to extract work from the heated working fluid and drive rotation of the compressor. The first heat-exchanger may be fluidly connected with the turbine to transfer heat away from the heated working fluid to provide a cooled working fluid.

In some embodiments, the fluid control system may be fluidly connected with the electrical system and the turbine engine to recirculate the working fluid through the electrical system and the turbine engine. The fluid control system may include a reservoir tank fluidly connected downstream of the first heat-exchanger. The reservoir tank may be configured to store a predetermined minimum volume of the working fluid at a predetermined minimum temperature. The predetermined minimum volume of the working fluid may be sufficient to maintain a temperature of the electrical system within a desired temperature threshold after a shutdown of the turbine engine in which a speed of the compressor and the turbine is below a predetermined speed. In some embodiments, the working fluid in the reservoir tank may envelop the electrical system.

In some embodiments, the predetermined minimum volume is equal to or greater than a total volume of the working fluid in at least the turbine and the heat source of the system. In some embodiments, the predetermined minimum volume of the working fluid may be 1.1 times the total volume of the working fluid in at least the turbine and the heat source of the system.

In some embodiments, the predetermined minimum volume may be equal to or greater than at least 0.4 times a total volume of the working fluid in at least the turbine and the heat source of the system. In some embodiments, the predetermined minimum volume of the working fluid may be about 0.9 times the total volume of the working fluid in at least the turbine and the heat source of the system.

In some embodiments, the turbine engine may further include a heat recuperator that transfers heat from the heated working fluid received from the turbine to the compressed working fluid passing from the compressor to the heat source. The predetermined minimum volume of the working fluid may be equal to or greater than the total volume of the working fluid in the turbine, the heat source, and the heat recuperator of the system.

In some embodiments, the electrical system may include a motor-generator coupled with the compressor. The motor-generator may be configured to operate in a motor mode to start the turbine engine and to operate in a power-generation mode to be driven by the turbine and generate electrical energy.

According to another aspect of the present disclosure, a method of operating a power-generation system may comprise compressing a working fluid with a compressor, heating the compressed working fluid, rotating a turbine with the heated working fluid, and cooling the heated working fluid after rotating the turbine with the heated working fluid. The method may further include conducting electrical energy to at least one electrical component, cooling the at least one electrical component with the cooled working fluid, and conducting the working fluid from the at least one electrical component to the compressor.

In some embodiments, the method may further include storing a predetermined minimum volume of the working fluid in a reservoir tank fluidly connected to the at least one electrical component and the turbine. The predetermined minimum volume may be sufficient to maintain a temperature of the at least one electrical component within a desired temperature threshold after a shutdown of the system in which a speed of the compressor and the turbine being below a predetermined speed.

In some embodiments, the working fluid in the reservoir tank may envelop the at least one electrical component. In some embodiments, the predetermined minimum volume may be equal to or greater than a total volume of the working fluid in at least the turbine and a heat source of the system.

These and other features of the present disclosure will become more apparent from the following description of the illustrative embodiments.

DETAILED DESCRIPTION OF THE DRAWINGS

Figure 1:
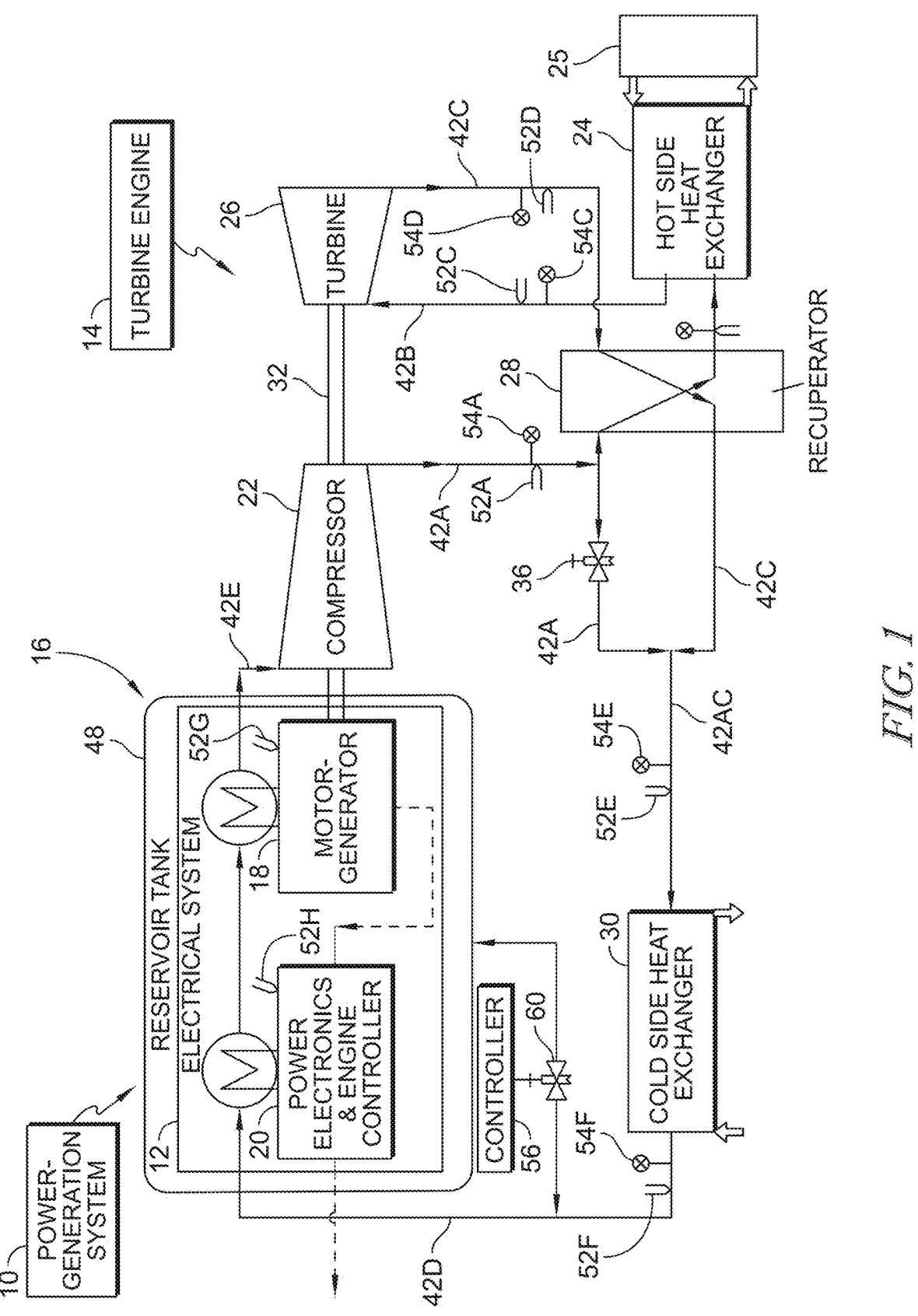
FIG. 1 is a diagrammatic view of a power-generation system according to the present disclosure, the system includes an electrical system, a turbine engine, and a fluid control system fluidly connected with the electrical system and the turbine engine to circulate the working fluid through the electrical system and the components of the turbine engine, and further showing the fluid control system includes a reservoir tank for storing a predetermined minimum volume of the working fluid that envelopes the electrical system to help maintain a temperature of the electrical system within the desired temperature threshold after a shutdown of the turbine engine.

For the purposes of promoting an understanding of the principles of the disclosure, reference will now be made to a number of illustrative embodiments illustrated in the drawings and specific language will be used to describe the same.

Figure 2:
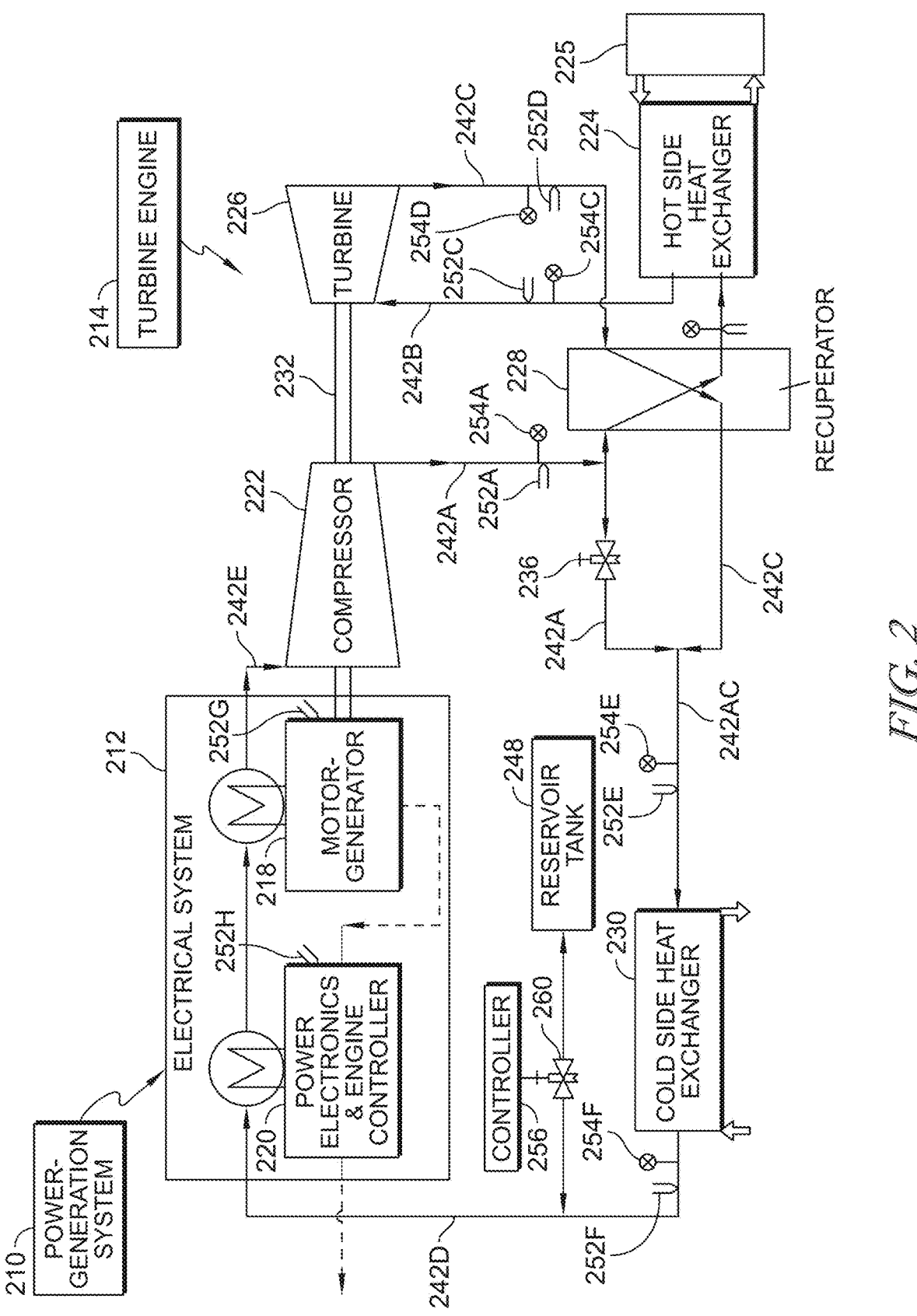
FIG. 2 is a diagrammatic view of another embodiment of a power-generation system that includes an electrical system, a turbine engine, and a fluid control system comprising a standalone reservoir tank for storing a predetermined minimum volume of the working fluid.

An illustrative power-generation system 10 includes an electrical system 12, a turbine engine 14, and a fluid control system 16 fluidly connected with the electrical system 12 and the turbine engine 14 to circulate working fluid through the electrical system 12 and the turbine engine 14 as shown in FIGS. 1-3. The turbine engine 14 includes a compressor 22 that compresses a working fluid 42E to provide compressed working fluid 42A, a heat source 24, illustratively a reactor heat-exchanger 24, downstream of the compressor 22 that heats the compressed working fluid 42A to provide heated compressed working fluid 42B, and a turbine 26 downstream of the heat source 24 that extracts work from the heated compressed working fluid 42B to provide low-pressure working fluid 42C and drive rotation of the compressor 22.

In some embodiments, the turbine engine 14 includes an optional heat recuperator 28 that pre-heats the compressed working fluid 42A using heat from the low-pressure working fluid 42C, as shown in FIG. 1. The turbine engine 14 further includes a cooling heat-exchanger 30 arranged downstream of the turbine 26 that cools the low-pressure working fluid 42C received from the turbine 26 to provide cooled working fluid 42D.

The electrical system 12 is configured to produce electrical energy from the rotational power of the turbine engine 14 and/or convert the electrical energy into rotational power. The components of the electrical system 12 may have temperature limits such that the electrical system 12 is cooled during operation of the system 10. Other system have a separate dedicated cooling system for the electrical system 12. This allows the temperature of the electrical system 12 to be independently controlled, but adds components and complexity to the overall system.

To minimize components and secondary cooling systems, the electrical system 12 of the present application is located downstream of the cooling heat-exchanger 30 and configured for fluid cooling for removing heat from the electrical system 12. In this way, the cooled working fluid 42D from the cooling heat-exchanger may be used to cool the electrical system 12. During steady state operation, the cooling heat-exchanger 30 lowers the working fluid temperatures to an acceptable range to cool the whole system 10 as well as the electrical system 12.

The ability to pass the cooled working fluid across the electrical system 12 is maintained while the turbomachinery operating and moving fluid throughout the system 10. During a shutdown, the speed of the compressor 22 and the turbine 26 drops below a predetermined speed as the turbine engine 14 comes to a stop. Upon shutdown of the turbine engine 14, the system 10 will tend towards an equilibrium temperature with higher temperature and pressure states (e.g., within the turbine 26) dominating the overall equilibrium. This is due to the significantly higher volume of fluid at high temperatures rather than lower temperatures. Without the system 10 operating, the cooling capabilities may be minimized or eliminated such that sufficient heat is not rejected from the electrical system 12 to the working fluid or excessive heat from the working fluid is transferred to the electrical system 12.

The equilibrium temperature may be higher than acceptable or desired operating temperatures of the electrical system 12. Therefore, the fluid control system 16 of the present disclosure is adapted to thermally protect the electrical system 12 during and after shutdown of the system 10. In the illustrative embodiments, the fluid control system 16 includes a reservoir tank 48 fluidly connected downstream of the cooling heat-exchanger 30 and configured to store a predetermined minimum volume of the working fluid. The working fluid in the reservoir tank 48 may be isolated from a majority of the working fluid during operation of the system 10 and thus kept at a predetermined minimum temperature that is less than a temperature of the working fluid in the hot side components of the system 10 (i.e., the heat source 24, the turbine 26, and/or the recuperator 28).

Due to the harsh environment around space and other terrestrial, the only way to passively reject heat to the environment around the system is through radiation. However, this method of heat rejection to the environment is not as efficient compared to convection or conduction methods and needs significantly more time to reject heat. When the turbine engine 14 shuts down, there is not enough time to rely on radiation to cool the working fluid and protect the electrical system 12 from a high equilibrium temperature.

Therefore, the reservoir tank 48 is included to store the predetermined minimum volume of the working fluid that may be passively cooled while the system 10 is running. The reservoir tank 48 The reservoir tank 48 allows enough time for the predetermined minimum volume of the working fluid stored therein to be cooled to a predetermined minimum temperature that is less than a temperature of the working fluid of the hot side components of the system 10 (i.e., the heat source 24, the turbine 26, and/or the recuperator 28). The predetermined minimum volume of the working fluid in the reservoir tank 48 is sufficient to maintain a temperature of the electrical system 12 within a desired temperature threshold after the shutdown of the turbine engine 14, providing an additional thermal mass to lower an overall equilibrium temperature of the working fluid after shutdown of the turbine engine 14. This prevents the delicate power conversion equipment of the electrical system 12 from otherwise being exposed to these high temperatures during shutdown.

The predetermined minimum volume of the working fluid in the reservoir tank 48 may be determined based on the expected environmental conditions, operating conditions, installation conditions, etc. such that the predetermined minimum volume is sufficient to maintain the temperature of the electrical system 12 within the desired temperature threshold after the shutdown of the turbine engine 14. The reservoir tank 48 increases the total volume of the working fluid in the cold-side components of the system 10 (i.e., the cooling heat-exchanger 30 and/or the electrical system 12) and prevents the higher temperature and pressure states (e.g., within the turbine 26) from dominating the equilibrium temperature. As a result, the equilibrium temperature is lowered to acceptable or desired operating temperatures of the electrical system 12 thereby preventing the electrical system 12 from being exposed to high-temperature after the shutdown.

The predetermined minimum volume of the working fluid may be about 40 precent or more of a total volume of the working fluid in the hot side components of the system 10 (i.e., the heat source 24, the turbine 26, and/or the recuperator 28). In some embodiments, the predetermined minimum volume of the working fluid in the reservoir tank 48 may be equal to or greater than the total volume of the working fluid in the hot side components of the system 10. For example, the predetermined minimum volume of the working fluid in the reservoir tank 48 may be 1.1 times the total volume of the working fluid in the hot side of the system 10.

In some embodiments, the predetermined minimum volume of the working fluid in the reservoir tank 48 may be less than the total volume in the hot side components of the system 10, but greater than at least 40 percent of the total volume in the hot side of the system 10. For example, the predetermined minimum volume of the working fluid in the reservoir tank 48 may be about 0.9 times or about 90 precent of the total volume of the working fluid in the hot side of the system 10. In some embodiments, the predetermined minimum volume of the working fluid in the reservoir tank 48 may be about 0.8 times or about 80 precent of the total volume of the working fluid in the hot side of the system 10. In some embodiments, the predetermined minimum volume of the working fluid in the reservoir tank 48 may be about 0.7 times or about 70 precent of the total volume of the working fluid in the hot side of the system 10.

In some embodiments, the predetermined minimum volume of the working fluid in the reservoir tank 48 may be about 0.6 times or about 60 precent of the total volume of the working fluid in the hot side of the system 10. In some embodiments, the predetermined minimum volume of the working fluid in the reservoir tank 48 may be about 0.5 times or about 50 precent of the total volume of the working fluid in the hot side of the system 10. In some embodiments, the predetermined minimum volume of the working fluid in the reservoir tank 48 may be about 0.4 times or about 40 precent of the total volume of the working fluid in the hot side of the system 10. The predetermined minimum volume of the working volume of the working fluid in the reservoir tank 48 may be no less than about 40 precent of the total volume in the hot side components of the system 10.

As shown in FIG. 1, the reservoir tank 48 may envelop the electrical system 12 so that the components of the electrical system 12 are submerged in the working fluid. In other embodiments, the reservoir tank 248 is a standalone, passive tank plumbed from the cold side of the system 210 and does not envelop the electrical system 212 as shown in FIG. 2. The cooler working fluid in the reservoir tank 48 helps maintain the temperature of the electrical system 12 within the desired temperature threshold after the shutdown of the turbine engine 14. In some embodiments, only certain components of the electrical system 12 may be enveloped by the reservoir tank 48.

With an initial description of the system 10 provided above, the system 10 is hereafter described in further detail. The electrical system 12 includes a motor-generator 18 and an electric power conditioning and distribution system 20 as shown in FIG. 1. The motor-generator 18 of the electrical system 12 is coupled with the turbine engine 14 and operable in a power-generation mode to produce electrical energy and a motor mode to convert the electrical energy into rotational power. The motor-generator 18 operates in the motor mode to start the turbine engine 14 and operates in the power-generation mode to be driven by the turbine engine 14 and generate the electrical energy. In this way, the heat from the heat source 24 may be used to generate electrical energy. The power conditioning and distribution system 20 may supply electrical energy to auxiliary systems. The power conditioning and distribution system 20 may supply electrical energy to auxiliary systems.

The turbine engine 14 includes the compressor 22, the heat source or reactor heat-exchanger 24, the turbine 26, the heat recuperator 28, and the cooling heat-exchanger 30 as shown in FIG. 1. The reactor heat-exchanger 24 is also sometimes referred to as the hot side heat-exchanger 24. The cooling heat-exchanger 30 is also sometimes referred to as the cold side heat-exchanger 30.

The compressor 22 of the turbine engine 14 compresses the working fluid 42E to provide the compressed working fluid 42A, as shown in FIG. 1. From the compressor 22, the compressed working fluid 42A is conducted toward the heat recuperator 28 and the reactor heat-exchanger 24. A portion of the compressed working fluid 42A may also be conducted from the outlet of the compressor 22 toward the cooling heat-exchanger 30 via a bypass valve 36 if operating conditions (pressure, temperatures, etc.) are met.

The compressed working fluid 42A flows from an outlet of the compressor 22, through the heat recuperator 28, and to the heat source 24. In the illustrative embodiment, the compressed working fluid 42A flows from the outlet of the compressor 22, through the heat recuperator 28, and to the reactor heat-exchanger 24, as shown in FIG. 1. The reactor heat-exchanger 24 transfers heat from a nuclear reactor 25 to the compressed working fluid 42A to provide heated compressed working fluid 42B.

In the illustrative embodiment, the reactor heat-exchanger 24 is fluidly coupled with the nuclear reactor 25 to transfer heat from a hot fluid of the nuclear reactor 25 to the compressed working fluid 42A. In other embodiments, other heat sources may be used to heat the compressed working fluid 42A.

The heated compressed working fluid 42B from the reactor heat-exchanger 24 is conducted to an inlet of the turbine 26, as shown in FIG. 1. The turbine 26 extracts work from the heated compressed working fluid 42B to drive the compressor 22 and the motor-generator 18 through a shaft 32. The compressor 22 and the motor-generator 18 are directly driven by the turbine 26 in the illustrative embodiment. In other embodiments, the compressor 22 and/or the motor-generator 18 are indirectly driven by the turbine 26 via transmissions, gearboxes, additional generator/battery systems, etc.

In the illustrative embodiment, from an outlet of the turbine 26, a low-pressure working fluid 42C flows to the heat recuperator 28, as shown in FIG. 1. The heat recuperator 28 is arranged between the compressor 22 and the reactor heat-exchanger 24. The heat recuperator 28 receives the low-pressure working fluid 42C from the turbine 26 and transfers heat from the low-pressure working fluid 42C to the compressed working fluid 42A passing from the compressor 22 to the reactor heat-exchanger 24. Thus, heat is transferred to the compressed working fluid 42A in each of the heat recuperator 28 (via the low-pressure working fluid 42C) and the reactor heat-exchanger 24 (via the hot fluid of the nuclear reactor 25) before the heated compressed working fluid 42B flows to the inlet of the turbine 26. In other embodiments, the heat recuperator 28 is omitted.

The low-pressure working fluid 42C flows from the heat recuperator 28 to the cooling heat-exchanger 30, as shown in FIG. 1. The cooling heat-exchanger 30 is located downstream of the turbine 26 and the heat recuperator 28. The cooling heat-exchanger 30 may also receive a portion of the compressed working fluid 42A from the outlet of the compressor 22 depending on the position of the bypass valve 36. The cooling heat-exchanger 30 transfers heat away from the working fluid 42AC via a cooling fluid flowing through the cooling heat-exchanger 30.

Cooled working fluid 42D exits the cooling heat-exchanger 30 and flows toward the electrical system 12 and the compressor 22, as shown in FIG. 1. The electrical system 12 transfers heat to the cooled working fluid 42D. The working fluid 42E then flows to the compressor 22 where it is compressed to provide compressed working fluid 42A, and the compressed working fluid 42A recirculates through the cycle of the turbine engine 14. Thus, the system 10 is a closed loop system or the fluid control system 16 is closed loop such that the working fluid is recirculated through the system 10.

The fluid control system 16 includes the reservoir tank 48 and a plurality of sensors 52A-H, 54A-F as shown in FIG. 1. The plurality of sensors 52A-H, 54A-F includes temperature sensors 52A-F configured to measure a temperature of the working fluid in the system 10, temperature sensors 52G, 52H configured to measure the temperature of the electrical system 12, and pressure sensors 54A-F configured to measure the pressure of the working fluid in the system 10.

The plurality of sensors 52A-H, 54A-F includes a first temperature sensor 52A, a second temperature sensor 52B, a third temperature sensor 52C, a fourth temperature sensor 52D, a fifth temperature sensor 52E, and a sixth temperature sensor 52F as shown in FIG. 1. The first temperature sensor 52A is positioned downstream of the compressor 22 and upstream of the recuperator 28. The second temperature sensor 52B is positioned downstream of the recuperator 28 and upstream of the reactor heat-exchanger 24. The third sensor 52C is positioned downstream of the reactor heat-exchanger 24 and upstream of the turbine 26. The fourth sensor 52D is positioned downstream of the turbine 26 and upstream of the recuperator 28. The fifth sensor 52E is positioned upstream of the cooling heat-exchanger 30 and downstream of the recuperator 28 and the compressor. The sixth sensor 52F is positioned downstream of the cooling heat-exchanger 30 and upstream of the electrical system 12.

The plurality of sensors 52A-H, 54A-F includes a seventh sensor 52G and an eighth sensor 52H as shown in FIGS. 1-3. The seventh sensor 52G is in thermal communication with the motor-generator 18 of the electrical system 12 to measure the temperature of the motor-generator 18. The eighth sensor 52H is in thermal communication with the power conditioning and distribution system 20 of the electrical system 12 to measure the temperature of the power conditioning and distribution system 20.

The plurality of sensors 54A-F, 54A-F includes a first pressure sensor 54A, a second pressure sensor 54B, a third pressure sensor 54C, a fourth pressure sensor 54D, a fifth pressure sensor 54E, and a sixth pressure sensor 54F. The first pressure sensor 54A is positioned downstream of the compressor 22 and upstream of the recuperator 28. The second pressure sensor 54B is positioned downstream of the recuperator 28 and upstream of the reactor heat-exchanger 24. The third sensor 54C is positioned downstream of the reactor heat-exchanger 24 and upstream of the turbine 26. The fourth sensor 54D is positioned downstream of the turbine 26 and upstream of the recuperator 28. The fifth sensor 54E is positioned upstream of the cooling heat-exchanger 30 and downstream of the recuperator 28 and the compressor. The sixth sensor 54F is positioned downstream of the cooling heat-exchanger 30 and upstream of the electrical system 12.

A shutdown may be initiated for multiple reasons. In some embodiments, a user may direct the system 10 to initiate a shutdown. In some embodiments, the shutdown may be initiated based on the measurements from the plurality of sensors 52A-H, 54A-F.

Once a shutdown sequence is initiated, the turbine inlet temperature is lowered to the lowest value possible to maintain a self-sustaining cycle with the working fluid still circulating in the system 10. The speed of the turbine engine 14 is reduced to lowest value possible which to lower exit temperature of the compressor 22 and to lower inlet temperature of the cooling heat-exchanger 30. As turbine engine 14 comes to a stop, the speed of the compressor 22 and the turbine 26 drops below a predetermined speed.

In some embodiments, the predetermined speed is greater than zero or before the turbine engine 14 comes to a full stop. In some embodiments, the predetermined speed is zero or when the turbine engine 14 reaches a full stop.

The total working fluid temperature, or the equilibrium temperature, may be higher than the operating temperature limits of the power electronics of the electrical system 12. The hot side of the system 10, which includes the reactor heat-exchanger 24, the turbine 26, and the recuperator 28, is at a higher temperature at shutdown than the cold side of the system 10, which includes the cooling heat-exchanger 30 and the electrical system 12.

The reservoir tank 48 has a predetermined minimum volume of the working fluid that is sufficient to maintain a temperature of the electrical system 12 within the desired temperature threshold after the shutdown of the turbine engine 14. The desired temperature threshold for the electrical system 12 may be between about 125 degrees Celsius and about 455 degrees Celsius. In some embodiments, the desired temperature threshold for the electrical system 12 may be between about 134 degrees Celsius and about 453 degrees Celsius.

The predetermined minimum volume of the working fluid may be about 40 precent or more of the total volume of the working fluid in the hot side components of the system 10, which may include the reactor heat-exchanger 24, the turbine 26, and the recuperator 28. In some embodiments, the predetermined minimum volume may be equal to or greater than the total volume of the working fluid in the hot side of the system 10. In some embodiments, the predetermined minimum volume may be less than the total volume of the working fluid in the hot side of the system 10, but greater than at least 40 precent of the total volume in the hot side of the system 10. The predetermined minimum volume of the reservoir tank 48 increases the volume of the cold side of the system 10 and provides additional thermal mass to lower an overall equilibrium temperature of the working fluid after the shutdown of the turbine engine 14.

A method of operating the system 10 may include several steps. The method includes compressing a working fluid with the compressor 22, heating the compressed working fluid, and rotating the turbine 26 with the heated working fluid. The method further includes cooling the heated working fluid after rotating the turbine 26 with the heated fluid and cooling at least one electrical component with the cooled working fluid. The system 10 is a closed-loop power generation system 10 such that the working fluid is recirculated through the system 10. Therefore, the method further includes conducting the working fluid from the at least one electrical component to the compressor 22.

The method also includes conducting electrical energy to at least one electrical component of the electrical system 12. The method also includes driving the motor-generator 18 with the work extracted from the turbine 26 to produce the electrical energy. The method also includes converting the electrical energy into rotational power to start the turbine engine 14.

The method further includes storing a predetermined minimum volume of working fluid in the reservoir tank 48 fluidly connected to the electrical system 12 and the turbine engine 14. The predetermined minimum volume is sufficient to maintain the temperature of the electrical system 12 within the desired temperature threshold after the shutdown. The predetermined minimum volume of the working fluid may be about 40 precent or more of the total volume of the working fluid in the hot side components of the system 10 such that the equilibrium temperature that results after shutdown is lowered to maintain the temperature of the electrical system 12 within the desired temperature threshold.

In some embodiments, the predetermined minimum volume may be equal to or greater than the total volume of the working fluid in the hot side of the system 10. In some embodiments, the predetermined minimum volume may be less than the total volume of the working fluid in the hot side of the system 10, but greater than at least 40 precent of the total volume in the hot side of the system 10. The method also includes allowing fluid communication between the reservoir tank 48 and the rest of the system 10 in response to a speed of the compressor 22 and the turbine 26 being below a predetermined speed.

Another embodiment of a power-generation system 210 in accordance with the present disclosure is shown in FIG. 2. The power-generation system 210 is substantially similar to the power-generation system 10 shown in FIG. 1 and described herein. Accordingly, similar reference numbers in the 200 series indicate features that are common between the power-generation system 10 and the power-generation system 210. The description of the power-generation system 10 is incorporated by reference to apply to the power-generation system 210, except in instances when it conflicts with the specific description and the drawings of the power-generation system 10.

The power-generation system 210 includes an electrical system 212, a turbine engine 214, and a fluid control system 216 fluidly connected with the electrical system 212 and the turbine engine 214 to circulate working fluid through the electrical system 212 and the turbine engine 214 as shown in FIG. 2. The fluid control system 216 includes a reservoir tank 248 as shown in FIG. 2.

Unlike the reservoir tank 48 in FIG. 1, which envelops the electrical system 12, the reservoir tank 248 is a standalone tank that does not envelop the electrical system 12. The components of the electrical system 12 are outside of the reservoir tank 48 and not submerged within the working fluid in the reservoir tank 48.

The electrical system 212 includes a motor-generator 218 and an electric power conditioning and distribution system 220 as shown in FIG. 1. The motor-generator 218 of the electrical system 212 is coupled with the turbine engine 214 and operable in a power-generation mode to produce electrical energy and a motor mode to convert the electrical energy into rotational power.

The turbine engine 214 includes a compressor 222 that compresses a working fluid 242E to provide compressed working fluid 242A, a heat source 224, illustratively a reactor heat-exchanger 224, downstream of the compressor 222 that heats the compressed working fluid 242A to provide heated compressed working fluid 242B, and a turbine 226 downstream of the heat source 224 that extracts work from the heated compressed working fluid 242B to provide low-pressure working fluid 242C and drive rotation of the compressor 222.

The compressor 222 of the turbine engine 214 compresses the working fluid 242E to provide the compressed working fluid 42A. From the compressor 222, the compressed working fluid 242A is conducted toward the heat recuperator 228 and the reactor heat-exchanger 224. A portion of the compressed working fluid 242A may also be conducted from the outlet of the compressor 222 toward the cooling heat-exchanger 230 via a bypass valve 236 if operating conditions (pressure, temperatures, etc.) are met.

The compressed working fluid 242A flows from an outlet of the compressor 222, through the heat recuperator 228, and to the heat source 224. In the illustrative embodiment, the compressed working fluid 242A flows from the outlet of the compressor 222, through the heat recuperator 228, and to the reactor heat-exchanger 224, as shown in FIG. 2. The reactor heat-exchanger 224 transfers heat from a nuclear reactor 225 to the compressed working fluid 242A to provide heated compressed working fluid 242B.

The heated compressed working fluid 242B from the reactor heat-exchanger 224 is conducted to an inlet of the turbine 226, as shown in FIG. 2. The turbine 226 extracts work from the heated compressed working fluid 242B to drive the compressor 222 and the motor-generator 218 through a shaft 232. The compressor 222 and the motor-generator 218 are directly driven by the turbine 226 in the illustrative embodiment. In other embodiments, the compressor 222 and/or the motor-generator 18 are indirectly driven by the turbine 226 via transmissions, gearboxes, additional generator/battery systems, etc.

In the illustrative embodiment, from an outlet of the turbine 226, a low-pressure working fluid 242C flows to the heat recuperator 228, as shown in FIG. 2. The heat recuperator 228 is arranged between the compressor 222 and the reactor heat-exchanger 224. The heat recuperator 228 receives the low-pressure working fluid 242C from the turbine 226 and transfers heat from the low-pressure working fluid 242C to the compressed working fluid 242A passing from the compressor 222 to the reactor heat-exchanger 24. Thus, heat is transferred to the compressed working fluid 242A in each of the heat recuperator 228 (via the low-pressure working fluid 242C) and the reactor heat-exchanger 224 (via the hot fluid of the nuclear reactor 225) before the heated compressed working fluid 242B flows to the inlet of the turbine 226. In other embodiments, the heat recuperator 228 is omitted.

The low-pressure working fluid 242C flows from the heat recuperator 228 to the cooling heat-exchanger 230, as shown in FIG. 2. The cooling heat-exchanger 230 is located downstream of the turbine 226 and the heat recuperator 228. The cooling heat-exchanger 230 may also receive a portion of the compressed working fluid 242A from the outlet of the compressor 222 depending on the position of the bypass valve 236. The cooling heat-exchanger 230 transfers heat away from the working fluid 242AC via a cooling fluid flowing through the cooling heat-exchanger 230.

Cooled working fluid 242D exits the cooling heat-exchanger 230 and flows toward the electrical system 212 and the compressor 222, as shown in FIG. 2. The electrical system 212 transfers heat to the cooled working fluid 242D. The working fluid 242E then flows to the compressor 222 where it is compressed to provide compressed working fluid 242A, and the compressed working fluid 242A recirculates through the cycle of the turbine engine 214.

As shown in FIG. 2, the fluid control system 216 further includes a plurality of sensors 252A-H, 254A-F. The plurality of sensors 252A-H, 254A-F includes temperature sensors 252A-F configured to measure a temperature of the working fluid in the system 210, temperature sensors 252G, 252H configured to measure the temperature of the electrical system 212, and pressure sensors 254A-F configured to measure the pressure of the working fluid in the system 10.

Closed Brayton cycle systems may be used for terrestrial or space satellite power generation using nuclear reactions or other heat sources (i.e. concentrated solar power heat source, fusion, etc.). Closed Brayton cycle systems may be used with a nuclear reactor (or other heat sources) to provide a combustion heat source. Closed Brayton cycle systems may be more efficient at converting nuclear reactor heat to electric power than traditional methods such as a radioisotope generator converting heat to power.

Due to the harsh environment around space and other terrestrial uses, it may be difficult to service the hardware and long component life is desirable. It may be advantageous to keep electrical components cool for improved reliability. Cooled working fluid may be used to maintain long-life operating temperatures of motor-generator and power conditioning and distribution systems.

There are temperature limits for typical electrical components used to convert mechanical energy into electrical power, including both the power electronics and/or the alternator/generator. To minimize components and secondary cooling systems the thermal management of the power conversion system may, during steady state operation, be maintained by the working fluid passing across power conversion cooling systems after passing through the cooling heat-exchanger 30 of the system 10. The cooling heat-exchanger 30 lowers the temperature of the working fluid to an acceptable range for the electrical system 12.

The ability to pass the desired cool working fluid across the power conversion system may only be maintained while the turbomachinery is moving fluid throughout the system. Upon shut down of the turbomachinery, the closed system will tend towards an equilibrium temperature with the higher temperature and pressure states (e.g., within the turbine) dominating the overall equilibrium. This is due to the significantly higher volume of fluid at high temperatures rather than lower temperatures. The equilibrium temperature is significantly higher than the operating temperature limits of the power electronics.

The predetermined minimum volume is a sufficient volume of cooler working fluid to offset the high temperature of the hot side components so that the resulting equilibrium temperature is sufficiently low to protect the electrical equipment 12, 212. Including reservoir tank 48, 248 acts as an additional thermal mass after shutdown. This is in lieu of using outside energy source(s) to motor the turbomachinery below the self-sustainment speeds.

While the turbine engine 14, 214 is running, the system 10 provides sufficiently cool air to the cold side volume including the electrical system 12, 212. A shutdown sequence is then initiated such that turbine inlet temperature is lowered to the lowest value possible to maintain a self-sustaining cycle with fluid still flowing. The system operating speed is reduced to lowest value possible, which lowers the compressor exit temperature and lowers the cold side heat exchanger inlet temperature. As turbomachinery comes to a stop, the temperature equilibrium is achieved. Due to the significant volume in the reservoir tank 48, 248, the resulting equilibrium temperature is sufficient low to protect the electrical system 12, 212.

In the illustrative embodiments, the reservoir tank 48, 248 is fluidly coupled to the system 10 downstream of the cooling heat-exchanger 30. In some embodiments, the reservoir tank 48, 248 may be fluidly coupled to the system 10 at another location. Preferably, the reservoir tank 48, 248 is fluidly coupled to the system 10 at the coolest point in the system 10 during operation to minimize the tank volume.

As used herein, the term "about" refers to the cited value being within the errors arising from the standard deviation found in their respective testing measurements, and if those errors cannot be determined, then "about" may refer to, for example, within 5%, 4%, 3%, 2%, or 1% of the cited value.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A power-generation system comprising:
an electrical system including a motor-generator and an electric power conditioning and distribution system connected with the motor-generator, the motor-generator operable in a power generation mode to produce electrical energy and a motor mode to convert the electrical energy into rotational power, and the electrical system configured for fluid cooling for removing heat from the electrical system,
a turbine engine including a compressor configured to receive a working fluid and compress the working fluid to provide a compressed working fluid, a reactor heat-exchanger downstream of the compressor that transfers heat from a nuclear reactor to the compressed working fluid to provide a heated working fluid, a turbine downstream of the reactor heat-exchanger and configured to extract work from the heated working fluid and drive rotation of the compressor and the motor-generator, and a cooling heat-exchanger downstream of the turbine to transfer heat away from the heated working fluid to provide a cooled working fluid, and
a closed-loop fluid control system fluidly connected with the electrical system and the turbine engine to recirculate the working fluid through the electrical system and the turbine engine, the fluid control system including a reservoir tank fluidly connected downstream of the cooling heat-exchanger and configured to store a predetermined minimum volume of the working fluid at a predetermined minimum temperature that is less than a temperature of the working fluid at the turbine or the reactor heat-exchanger,
wherein the predetermined minimum volume of the working fluid is sufficient so as to provide additional thermal mass to lower an overall equilibrium temperature of the working fluid after a shutdown of the turbine engine in which a speed of the compressor and the turbine is below a predetermined speed so that a temperature of the electrical system is maintained within a desired temperature threshold after the shutdown of the turbine engine.

2. The power-generation system of claim 1, wherein the working fluid in the reservoir tank envelops the electrical system to help maintain the temperature of the electrical system within the desired temperature threshold after the shutdown of the turbine engine.

3. The power-generation system of claim 1, wherein the predetermined minimum volume of the working fluid is equal to or greater than a total volume of the working fluid in at least the turbine and the reactor heat-exchanger of the system.

4. The power-generation system of claim 3, wherein the predetermined minimum volume of the working fluid is 1.1 times the total volume of the working fluid in at least the turbine and the reactor heat-exchanger of the system.

5. The power-generation system of claim 1, wherein the predetermined minimum volume is equal to or greater than at least 0.4 times a total volume of the working fluid in at least the turbine and the reactor heat-exchanger of the system.

6. The power-generation system of claim 5, wherein the predetermined minimum volume of the working fluid is about 0.9 times the total volume of the working fluid in at least the turbine and the reactor heat-exchanger of the system.

7. The power-generation system of claim 1, wherein the turbine engine further includes a heat recuperator that transfers heat from the heated working fluid received from the turbine to the compressed working fluid passing from the compressor to the reactor heat-exchanger.

8. The power-generation system of claim 7, wherein the predetermined minimum volume of the working fluid is equal to or greater than the total volume of the working fluid in the turbine, the reactor heat-exchanger, and the heat recuperator of the system.

9. The power-generation system of claim 1, wherein the motor-generator is coupled with the compressor and configured to operate in the motor mode to start the turbine engine and to operate in the power generation mode to be driven by the turbine and generate the electrical energy.

10. A power-generation system comprising:
an electrical system,
a turbine engine including a compressor configured to receive a working fluid and compress the working fluid to provide a compressed working fluid, a heat source that transfers heat to the compressed working fluid to provide a heated working fluid, a turbine fluidly connected with the compressor to extract work from the heated working fluid and drive rotation of the compressor, and a first heat-exchanger fluidly connected with the turbine to transfer heat away from the heated working fluid to provide a cooled working fluid, and a fluid control system fluidly connected with the electrical system and the turbine engine to recirculate the working fluid through the electrical system and the turbine engine, the fluid control system including a reservoir tank fluidly connected downstream of the first heat-exchanger and configured to store a predetermined minimum volume of the working fluid at a predetermined minimum temperature, wherein the predetermined minimum volume of the working fluid is sufficient to maintain a temperature of the electrical system within a desired temperature threshold after a shutdown of the turbine engine in which a speed of the compressor and the turbine is below a predetermined speed.

11. The power-generation system of claim 10, wherein the working fluid in the reservoir tank envelops the electrical system.

12. The power-generation system of claim 10, wherein the predetermined minimum volume is equal to or greater than a total volume of the working fluid in at least the turbine and the heat source of the system.

13. The power-generation system of claim 12, wherein the predetermined minimum volume of the working fluid is 1.1 times the total volume of the working fluid in at least the turbine and the heat source of the system.

14. The power-generation system of claim 10, wherein the predetermined minimum volume is equal to or greater than at least 0.4 times a total volume of the working fluid in at least the turbine and the heat source of the system.

15. The power-generation system of claim 14, wherein the predetermined minimum volume of the working fluid is about 0.9 times the total volume of the working fluid in at least the turbine and the heat source of the system.

16. The power-generation system of claim 10, wherein the turbine engine further includes a heat recuperator that transfers heat from the heated working fluid received from the turbine to the compressed working fluid passing from the compressor to the heat source, wherein the predetermined minimum volume of the working fluid is equal to or greater than the total volume of the working fluid in the turbine, the heat source, and the heat recuperator of the system.

17. The power-generation system of claim 10, wherein the electrical system includes a motor-generator coupled with the compressor and configured to operate in a motor mode to start the turbine engine and to operate in a power-generation mode to be driven by the turbine and generate electrical energy.

18. A method of operating a power-generation system, the method comprising:

compressing a working fluid with a compressor, heating the compressed working fluid, rotating a turbine with the heated working fluid, cooling the heated working fluid after rotating the turbine with the heated working fluid, conducting electrical energy to at least one electrical component, cooling the at least one electrical component with the cooled working fluid, conducting the working fluid from the at least one electrical component to the compressor, and storing a predetermined minimum volume of the working fluid in a reservoir tank fluidly connected to the at least one electrical component and the turbine, wherein the predetermined minimum volume is sufficient to maintain a temperature of the at least one electrical component within a desired temperature threshold after a shutdown of the system in which a speed of the compressor and the turbine being below a predetermined speed.

19. The method of claim 18, wherein the working fluid in the reservoir tank envelops the at least one electrical component.

20. The method of claim 18, wherein the predetermined minimum volume is equal to or greater than a total volume of the working fluid in at least the turbine and a heat source of the system.

* * * * *